United States Patent
Wright et al.

(10) Patent No.: US 7,164,683 B1
(45) Date of Patent: Jan. 16, 2007

(54) VIRTUAL PATH ASYNCHRONOUS TRANSFER MODE SWITCHING IN A PROCESSING SATELLITE COMMUNICATIONS SYSTEM

(75) Inventors: David A. Wright, Solana Beach, CA (US); Michael W. Mann, Gilbert, AZ (US); Aaron D. Falk, Norwalk, CT (US); Rhon L. Williams, Manhattan Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/408,808

(22) Filed: Sep. 29, 1999

(51) Int. Cl.
 H04L 12/28 (2006.01)
(52) U.S. Cl. .................... 370/397; 455/427; 455/428; 370/399
(58) Field of Classification Search ................ 370/325, 370/395, 414, 229, 235, 236, 238, 315, 316, 370/319, 428, 429, 389, 390, 392, 397, 413, 370/347, 328; 455/427, 12.1, 13.2, 134, 455/522, 411, 557, 419, 418, 412.1
See application file for complete search history.

(56) References Cited

U.S. PATENT DOCUMENTS

| | | | |
|---|---|---|---|
| 5,812,528 A * | 9/1998 | VanDervort | 370/235 |
| 5,875,189 A * | 2/1999 | Brownhill et al. | 370/395 |
| 5,903,564 A * | 5/1999 | Ganmukhi et al. | 370/399 |
| 6,094,433 A * | 7/2000 | Kunimoto et al. | 370/397 |
| 6,128,287 A * | 10/2000 | Freeburg et al. | 370/331 |
| 6,240,075 B1* | 5/2001 | Takahashi et al. | 370/325 |
| 6,295,283 B1* | 9/2001 | Falk | 370/325 |
| 6,310,879 B1* | 10/2001 | Zhou et al. | 370/397 |
| 6,349,097 B1* | 2/2002 | Smith | 370/390 |
| 6,349,323 B1* | 2/2002 | Wakizaka | 709/200 |
| 6,366,776 B1* | 4/2002 | Wright et al. | 455/427 |
| 6,400,925 B1* | 6/2002 | Tirabassi et al. | 455/12.1 |
| 6,496,508 B1* | 12/2002 | Breuckheimer et al. | 370/397 |
| 6,707,800 B1* | 3/2004 | Peyrovian et al. | 370/310.1 |

FOREIGN PATENT DOCUMENTS

JP 5-276189 10/1993

(Continued)

OTHER PUBLICATIONS

Hideki Toshinaga et al., "Study on the Configuration of Satellite On-Board ATM Switch", SAT98-45, The Institute of Electronics, Information and Communications Engineers, Vo. 98, No. 340, pp. 21-27.

(Continued)

*Primary Examiner*—Temica Beamer
*Assistant Examiner*—Joy Contee
(74) *Attorney, Agent, or Firm*—Posz Law Group, PLC

(57) ABSTRACT

The present invention provides a method (100) for virtual path switching of an ATM cell on a processing communications satellite. The method includes establishing a set of VPIs (104) associated with output ports on the satellite and assigning one VPI to an ATM cell (108). The ATM cell may then be received by an input port of the satellite (110). An associated output port (114) for the ATM cell is determined from the VPI, and the ATM cell is transferred to that output port (116). The present invention may also provide for multicast switching (400). The VPI assigned to the ATM cell may be associated with a multicast output port. The ATM cells may be reproduced (426) and reassigned with a new VPI from a multicast group of VPIs (428). The reproduced cells are received at an input port of the satellite (430) for routing to the corresponding output ports.

11 Claims, 10 Drawing Sheets

FOREIGN PATENT DOCUMENTS

JP     5-235991    9/1994
JP     7-079230    3/1995

OTHER PUBLICATIONS

Hideki Hukuda et al., "Study on On-Board Switch Control System", In84-66, The Institute of Electronics, Information and Communications Engineers, vol. 84, No. 216, pp. 1-6.

Makoto Eguti et al., "Satellite Digital Communication Circuit Switching System", SAT86-8, The Institute of Electronics, Information and Communications Engineers, vol. 86, No. 124, pp. 1-6.

Andrea Baiocchi and M. Listani, "An ATM-Like System Architecture for Satellite Communications Incuding On-Board Switching", International journal of Satellite Communications, vol. 14, Oct. 1996, pp. 386-412.

* cited by examiner

VIRTUAL PATH ASYNCHRONOUS TRANSFER MODE SWITCHING IN A PROCESSING SATELLITE COMMUNICATIONS SYSTEM

BACKGROUND OF THE INVENTION

The present invention relates to satellite communications systems. More specifically, the invention relates to a method and apparatus for virtual path asynchronous transfer mode switching in a processing satellite communications system.

Asynchronous Transfer Mode (ATM) is a cell-based switching and multiplexing technology which may be used as a general-purpose, connection-oriented transfer technique for a wide range of services. The primary unit of transfer in ATM is a cell (also referred to as an "ATM cell"). Each ATM cell is a specifically formatted data unit that is 53 bytes long and includes 48 information bytes (referred to below as the "payload") and 5 header bytes (called the "cell header"). The primary function of the cell header is to carry the address of the cell. The header includes two individual fields known as the Virtual Path Identifier (VPI) and the Virtual Channel Identifier (VCI), which jointly serve as the "addressing field." The VPI and VCI fields are comprised of 12 address bits and 16 address bits, respectively, providing a total of 28 bits of address.

The process of switching an ATM cell at an ATM switch element generally includes two steps: a routing step and a relabeling step. During the routing step, an output port of the switch is identified for each cell that arrives at an input port of the switch. In present ATM systems, large routing tables at each connecting point (i.e., node) along the virtual connection (explained below) are generally used to map the VPI and VCI from the input ports to the output ports of the ATM switch. The routing step may be performed, for example, by first indexing a particular memory location (as determined by part or all of the addressing field) in one of the routing tables. The routing information stored at the indexed memory location generally holds a routing tag which indicates the next link for the current ATM cell. This routing tag may then be attached to the current ATM cell, to identify that cell by its next link.

The second step in ATM switching is a relabeling step. Generally, the VPI and VCI only have "local significance." In other words, the VPI and VCI are only significant for one particular link of the virtual connection. Therefore, in order for accurate switching to occur at the next link, the VPI and possibly the VCI must often be changed or relabeled to provide a new address, so that the new address may be understood at the next link.

Generally, two levels of routing hierarchies, Virtual Paths (VP) and Virtual Channels (VC), are defined for ATM traffic. A VC link is defined as the unidirectional transport of ATM cells with the same VCI between a VC connecting point (i.e., a node) and either a VC endpoint (i.e., the origination or destination) or another VC connecting point. A VP describes the unidirectional transport of ATM cells belonging to a group of VCs that are associated with a common VPI. Each VP has a bandwidth associated with it limiting the number of VCs that may be multiplexed on a VP. A VP link provides unidirectional transfer of cells with the same VPI between a VP connecting point and either a VP endpoint or another VP connecting point.

One of two types of virtual connections between an ATM cell's origination and destination (i.e., between endpoints) is generally formed prior to data flow. This logical connection is generally established based on information in the cell headers, including the VCI and VPI. A Virtual Channel Connection (VCC) is a concatenated ordered list of VC links from one user to one or more other users. In general, the VCI in the cell header identifies a single VC on a particular VP. Similarly, a Virtual Path Connection (VPC) is a concatenated ordered list of VP links from one or more users to one or more other users. Thus, while a VCC or VPC exists between endpoints, a VC or VP may exist between an endpoint and a connecting point or between connecting points.

Generally, two types of switching are recognized in ATM. One type of switching is VP switching, where only the VPI is considered in the switching action, and the VCI is ignored. In this type of switching, the VPI alone is sufficient to determine, for example, an appropriate memory location in the routing tables. Here, relabeling of the VPI is allowed, but the VCI must remain unchanged. A second type of switching is VC switching, where the combination of the VCI and VPI is significant in both the routing and relabeling steps.

Today, satellite systems commonly transmit and receive communications signals to and from user terminals. Such satellite based communications systems may utilize one satellite or a constellation of several satellites to relay communications signals to and from the user terminals (fixed or mobile). Each satellite includes at least one antenna which defines the satellite's coverage region on the earth called its footprint. The satellite antenna(s) may divide the footprint into multiple beam spots, or the footprint may be a single beam spot. Each beam spot is assigned one or more frequency bands (subbands), in which communications signals travel between the satellite and each user terminal.

The user terminals communicate along preassigned communications channels in the subband. The transmission of information along a preassigned communications channel to a satellite switch occurs on the uplink, and the transmission of information along a preassigned communications channel from a satellite switch occurs on the downlink.

Current processing satellites typically transmit data in a "bent pipe" fashion where uplink transmissions are simply retransmitted on the downlink. In another method used by processing satellites to transmit data, uplink transmissions may be demodulated and decoded at the satellite to recover one or more ATM cells that were conveyed across the uplink transmission path (TP). The ATM cells are then switched onto the downlink TP serving the destination earth terminal to which the cell is directed. In addition, processing satellite systems may incorporate crosslinks which link one satellite to another. These crosslinks are analogous to inter-switch transmission paths in terrestrial ATM networks.

In satellite communications systems which use ATM, a virtual connection is generally established through the network from origination to destination, where ATM cells are routed over the same set of TPs for the duration of a call. As explained above, the virtual connections may be, for example, a Virtual Path Connection (VPC) or a Virtual Channel Connection (VCC) from origination to destination. Although ATM has been applied to satellite communications systems in the past, ATM switching has not been implemented in processing satellites.

When applying past ATM methods to processing satellite communications systems, several problems arise. First, the size of the routing tables needed to support VC switching is extremely large, thus greatly increasing the memory storage capacity requirements on the satellites. An increase in the required memory leads to an increase in both the physical size and the cost of communications satellites. Furthermore, this additional memory must be robust to protect against logic bits that are altered as a result of high energy particle bombardment. This radiation hardening further increases the cost of communications satellites.

A second disadvantage associated with past ATM switching applied to processing satellite communications systems is that VC switching (which is typically the type of ATM switching that is applied) would require a substantial amount of control traffic between a terrestrial network control center (NCC) and the satellite for each VCC that is set up or torn down by the system. The setting up and tearing down of VCCs occurs quite frequently in a large scale system such as a processing satellite system. Thus, the presence of frequent bursts of control traffic between the NCC and satellites greatly reduces the bandwidth capacity available in the uplinks and downlinks for transmission of substantive information. Further, the existence of control traffic introduces additional failure modes that may result due to lost or redirected cells bearing control information. In addition, the hardware required to process this control traffic increases the overall size and cost of the communications satellites.

A third disadvantage associated with standard ATM switching in a processing satellite communications systems is that the relabeling of the VPI and VCI typically required for VC switching generally constitutes additional processing in the cell switching process. Again, this results in additional hardware requirements which leads to an increase in the size and cost of the communications satellites.

A need exists in the satellite communications industry for a low cost and efficient method and apparatus for virtual switching in a beam spot processing satellite communications system.

BRIEF SUMMARY OF INVENTION

It is an object of the present invention to provide virtual path ATM switching in a processing communications satellite.

It is a further object of the present invention to provide a method for virtual path ATM switching in a processing communications satellite without the use of large routing tables.

It is a further object of the present invention to provide a method for virtual path ATM switching in a processing communications satellite with a reduced amount of overhead control traffic between a Network Control Center and the satellites.

It is a further object of the present invention to provide a method of virtual path ATM switching in a processing communications satellite which allows for multicast switching.

It is a further object of the present invention to provide a method of virtual path ATM switching in a processing communications satellite which provides for situations where more than $2^{16}$ addresses support a given downlink transmission path.

It is a further object of the present invention to provide a method of virtual path ATM switching in a processing communications satellite which allows for switching of ATM cells on an external virtual path connection.

It is a further object of the present invention to provide a method for virtual path ATM switching in a processing communications satellite which allows for switching with virtual channel connection specialization.

One or more the of the foregoing objects is met in whole or in part by a method for virtual path switching of an ATM cell on a processing communications satellite. The method establishes a set of virtual path identifiers (VPIs), where each VPI is associated with an output port on the satellite. The method also establishes a set of virtual channel identifiers (VCIs), and assigns one VPI and one VCI to an ATM cell.

After these preliminary steps are completed, an ATM cell is transmitted to, and then received at an input port of the satellite. The method may then examine the assigned VPI to determine the output port associated with that VPI, and then transfer the ATM cell to the appropriate output port based only on the value of the assigned VPI.

The present invention may be modified in several ways. In one embodiment, the VPI may be divided into a control subfield and a routing subfield. The routing subfield may then be examined to determine a corresponding output port to which the ATM cell is transferred.

In yet another embodiment, the present invention provides multicast switching. For example, the method may include providing at least one multicast routing table, and providing at least one multicast output port which leads to a multicast module contained on the satellite. In such an embodiment, the VPI assigned to the ATM cell is associated with one multicast output. Thus, the ATM cell is transferred to that multicast output and then to the multicast module to which the multicast output leads.

The multicast module may then examine the assigned VCI to determine (in one implementation) a corresponding memory location in one of the multicast routing tables. The addressing information at that memory location is read to determine a group of VPIs that represents the multicast group ("multicast group of VPIs"), and the ATM cell is reproduced for every distinct multicast group VPI. Then, the reproduced ATM cells are reassigned with a new VPI from the multicast group VPIs, and the reproduced cells are once again presented to an input port of the satellite. Thereafter, the reproduced cells are routed by the switch as though they are non-multicast cells.

DETAILED DESCRIPTION OF THE PREFERRED EMBODIMENT

Figure 1:
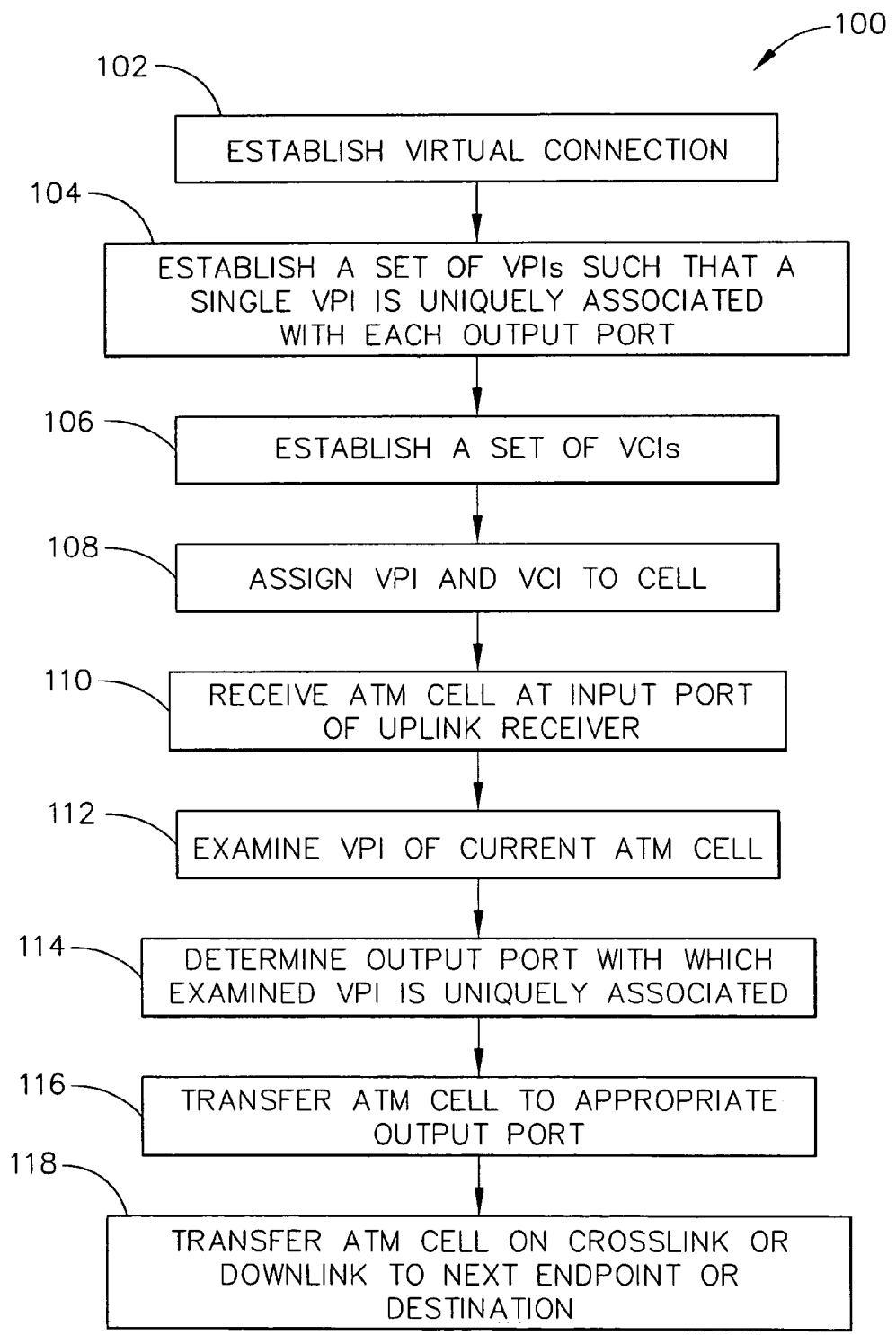
FIG. 1 illustrates a flow chart of virtual path switching of an ATM cell in accordance with the present invention.

FIG. 1 illustrates a flow chart 100 of a method for virtual path switching of an ATM cell on a processing satellite without the use of routing tables (referred to below as "the present method"). In the present method, all virtual connections (i.e., all virtual channel connections (VCCs) and virtual path connections (VPCs) in the processing satellite communications system are preferably addressed such that each downlink or crosslink transmission path may be determined from the virtual path identifier (VPI) alone for all cells present in the uplink. However, as discussed further below, the present method may be modified in a variety of ways, some of which may include examining the VCI to determine the downlink transmission path.

Figure 9:
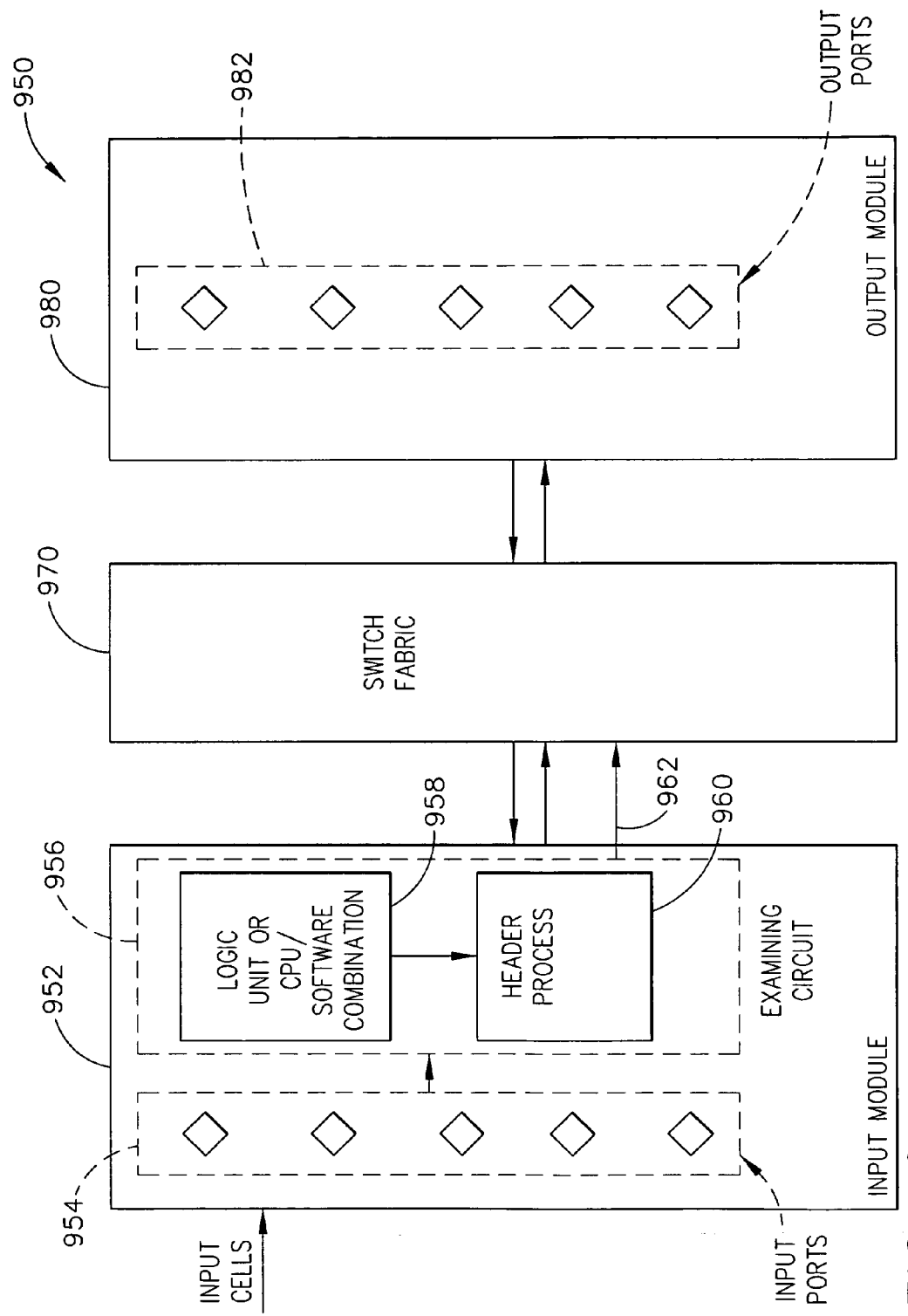
FIG. 9 illustrates an ATM switch on a processing satellite.

Turning briefly to FIG. 9, FIG. 9 illustrates an ATM switch 950 on a processing satellite. The ATM switch 950 generally includes an input module 952, a switch fabric 970 and an output module 980. The input module 952 may further include several input ports 954 and an examining circuit 956. The output module 980 may include several output ports 982. As explained further below, in accordance with a preferred embodiment of the present method, each output port 982 is uniquely associated with a single VPI, and the examining circuit 956 may easily determine to which output to switch a cell based on the cell's VPI.

In particular, returning to FIG. 1, in accordance with the present method 100, an ATM cell is received at an input port of a cell switch on a processing satellite (step 110). At the input port of the cell switch, the VPI of the current ATM cell is examined (step 112) by an examining circuit (described further below) to determine with which of the several output ports that VPI is uniquely associated (step 114). The cell is then transferred to that output port (step 116), from which the cell may then be sent to the next connecting point on a corresponding crosslink or to its destination on a corresponding downlink (step 118).

Prior to the switching steps described above, several preliminary steps 102–108 of the present method 100 generally occur to prepare the processing satellite system for switching of ATM cells. These preliminary actions may include, for example, establishing a virtual connection on which to transfer an ATM cell from the cell's origination to its destination (step 102) and establishing a set of VPIs and VCIs (steps 104, 106). Further, the present method includes assigning a particular VPI and VCI to the ATM cell (step 108).

According to a preferred embodiment of the present invention, the step of establishing a set of VPIs (step 104) includes establishing within the set of VPIs a single VPI uniquely associated with each output port, where each output port generally corresponds to a single downlink transmission path.

Generally, the virtual connection is established by a terrestrial control infrastructure such as a network control center ("NCC"). The NCC is a control center that manages transmission of information in a satellite communications system. In general, the NCC manages the operation and status of system resources. Among other responsibilities, the NCC relays communications signals to and from the user terminals and to and from the processing satellites.

In order to establish a virtual connection for communication, a user terminal may send an access request to the NCC, informing the NCC that the user terminal desires a connection with another user in the system. The access request is conveyed to the NCC via one or more satellites. In response thereto, the NCC selects an available virtual connection. In other words, the NCC performs an ATM Connection Admission Control (CAC) procedure. If the access request is granted, the NCC may assign a currently unused VCI for the virtual connection between the original user terminal to the destination terminal. The NCC informs the user terminal of the particular virtual connection via which the user terminal is to communicate, and further informs all the ATM nodes that make up the particular VPC or VCC that has been established.

Based on the virtual connection that has been established (step 102), the NCC assigns an appropriate VPI and VCI (referred to below as the assigned VPI and assigned VCI, respectively) to the ATM cells being transmitted by the user terminal (step 108). The VPI and VCI are respectively chosen from a set of VPI and VCIs established, for example, by the NCC (104, 106). In accordance with the present method, rather than indexing a routing table to obtain a routing tag, the assigned VPI is uniquely associated with a specific transmission path and thus, the assigned VPI constitutes the routing tag for that ATM cell. This is explained further below.

The VCI generally indicates the particular ATM device or user terminal to which the ATM cell is directed. As explained above, the VPI and VCI generally only have "local significance" (i.e., they only have significance for a particular link within the virtual connection). Thus, the VPI and sometimes the VCI are often relabeled at an ATM switching device before the ATM cell is sent on its next link. However, in the simplest embodiment of the present method, the VPI and VCI remain unchanged as a cell transits each link of its virtual connection.

An ATM switch on a processing satellite generally has several output ports to which ATM cells are transferred after they are routed by the switch fabric. In accordance with the present method, each ATM cell is preferably sent to an output port based only on the VPI in the cell's addressing field. As will be explained further below, the present method may be refined in various ways such that the VCI may also be taken into account.

As explained above, in accordance with the present method, once the ATM cell is received by the uplink receiver, the VPI of the current ATM cell is examined at the satellite (step 112). As illustrated in FIG. 9, the examining function may be done by an examining circuit 956. The examining circuit 956 may include, for example, a header processor 960 and either a hardwired identifier logic unit or a CPU/software combination 958. The examining circuit 956 then translates the VPI to determine with which output port the examined VPI is associated (step 114).

After the VPI is examined and translated by the examining circuit 956, the header processor 960 outputs a routing signal 962 to the switch fabric 970 of the ATM switch 950, indicating to which output port 982 the current ATM cell should be directed. The switch fabric 970, which may generally couple ATM cells from an input port to an output port based on the VPI, then transfers the current ATM cell to the appropriate output port 982 based on the routing signal 262 from the header processor 960 (step 116). Once in the appropriate output port, the ATM cell is sent either on a crosslink to the next connecting point along the virtual circuit, or on the downlink directly to the destination user terminal (step 118).

Figure 2:
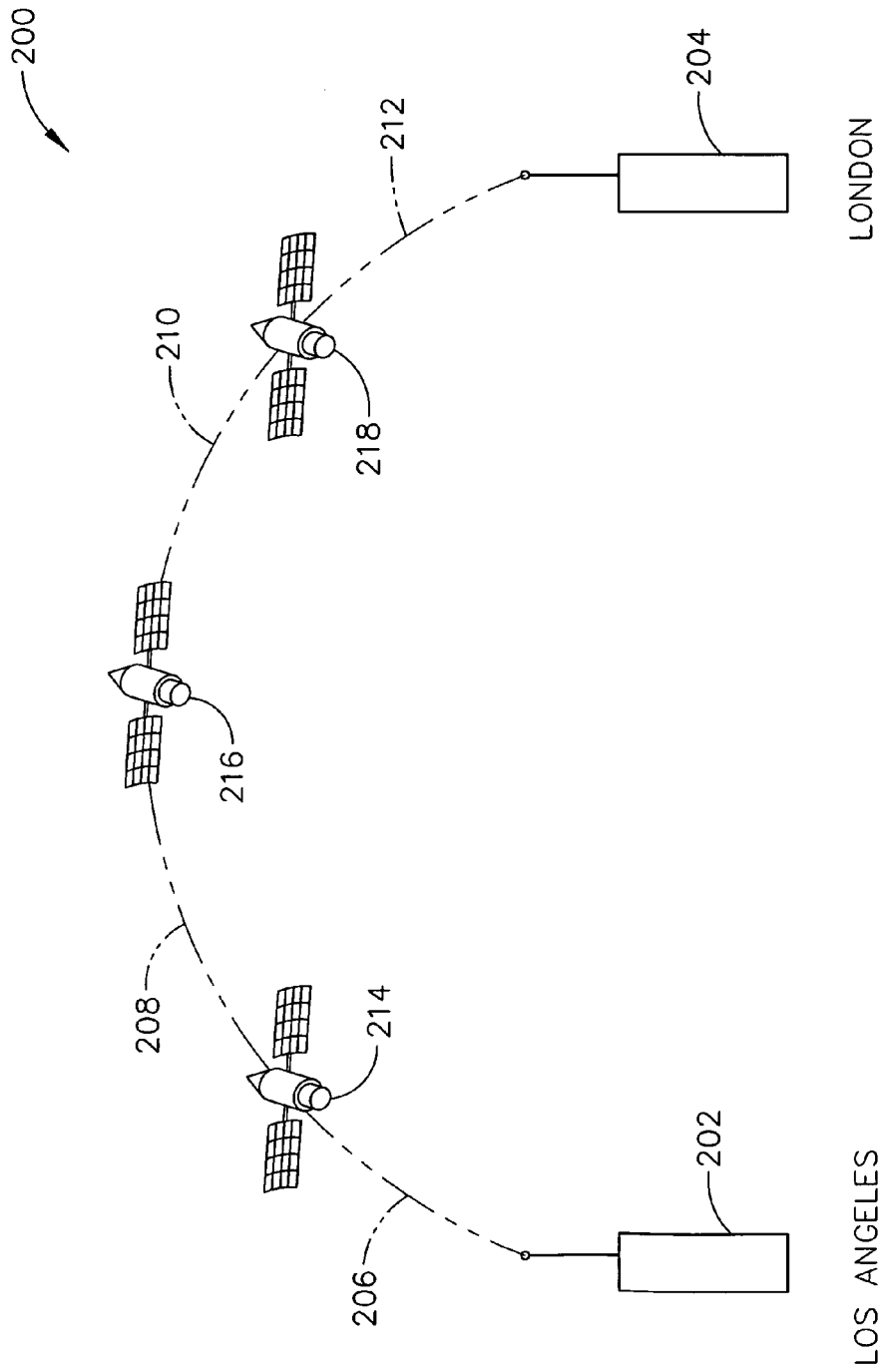
FIG. 2 illustrates a processing satellite ATM virtual connection formed from several links.

In the present method, the VPI itself provides all information needed to transfer cells across a virtual circuit, including in situations where one or more of the transmission paths may be a crosslink. As an example, consider FIG. 2 which shows a system comprised of three processing satellites 214, 216, 218 connected by crosslinks 208, 210. FIG. 2 further shows a user terminal in Los Angeles 202 and another user terminal in London 204. As an exemplary case, it is assumed that 64 beams are provided by each of the three satellites for a total of 192 beams. The three satellites 214, 216, 218 may be located, for example, at 120 W, 60 W and 0 longitude, respectively.

As each beam is uniquely associated with one VPI, VPIs numbered 64 through 127 may be associated with the westerly satellite's beams 214, 128 through 191 may be associated with the central satellite's beams 216, and 192 through 255 may be associated with the easterly satellite's beams 218. For example, the beam serving the Los Angeles terminal may be beam number 123 and the beam serving London terminal may be beam number 234. When the NCC is requested to set up a virtual connection between Los Angeles and London, the VCI selected is a 16 bit number unused by any other virtual connection terminating in the London beam (numbered 234). For this example the VCI is assumed to be "X".

In communicating with the user terminal in London 204 according to the present method, the Los Angeles user terminal 202 addresses all cells directed to the London user terminal 204 with the specific VPI/VCI labeled 234/X, and launches those cells in its uplink 200. At the westerly satellite 214, all cells with VPIs in the range 128 through 255 are switched to the output port serving the next crosslink 208. This switching is effected without a lookup table or routing table. Rather, in accordance with the present method, the switching is based solely on the appropriate bits in the VPI field.

After transiting the next crosslink 208, the cell arrives at the central satellite 216. Based on the present method, at the central satellite 216, all cells with VPIs in the range 192 to 255 are switched to the output port serving crosslink 210, again without any lookup or routing tables. After transiting crosslink 210, the cell arrives at the easterly satellite 218 where the cell is routed into the downlink 212 serving the London beam, beam number 234. At the easterly satellite 218 all cells with VPIs in the range 192 though 255 are routed to the corresponding downlink beam, where each of these downlink beams emanates from the easterly satellite 218. The example cell is routed from the crosslink to the output port serving beam 234 (London beam). The destination terminal 204 in the present example examines each cell present in the downlink 212 for beam 234 and reads only those cells with VCI equal to X.

As alluded to above, there are various refinements to the present invention which make the present method of virtual path ATM switching in a processing communications system much more flexible. In one refinement, for example, the present method is improved to provide for multicast switching. Multicast switching provides the capability for a single ATM cell in the uplink to be routed to more than one destination in multiple downlink transmission paths (referred to as a multicast cell). The set of user terminals that are intended recipients of a multicast cell is referred to as a "multicast group."

Figure 3:
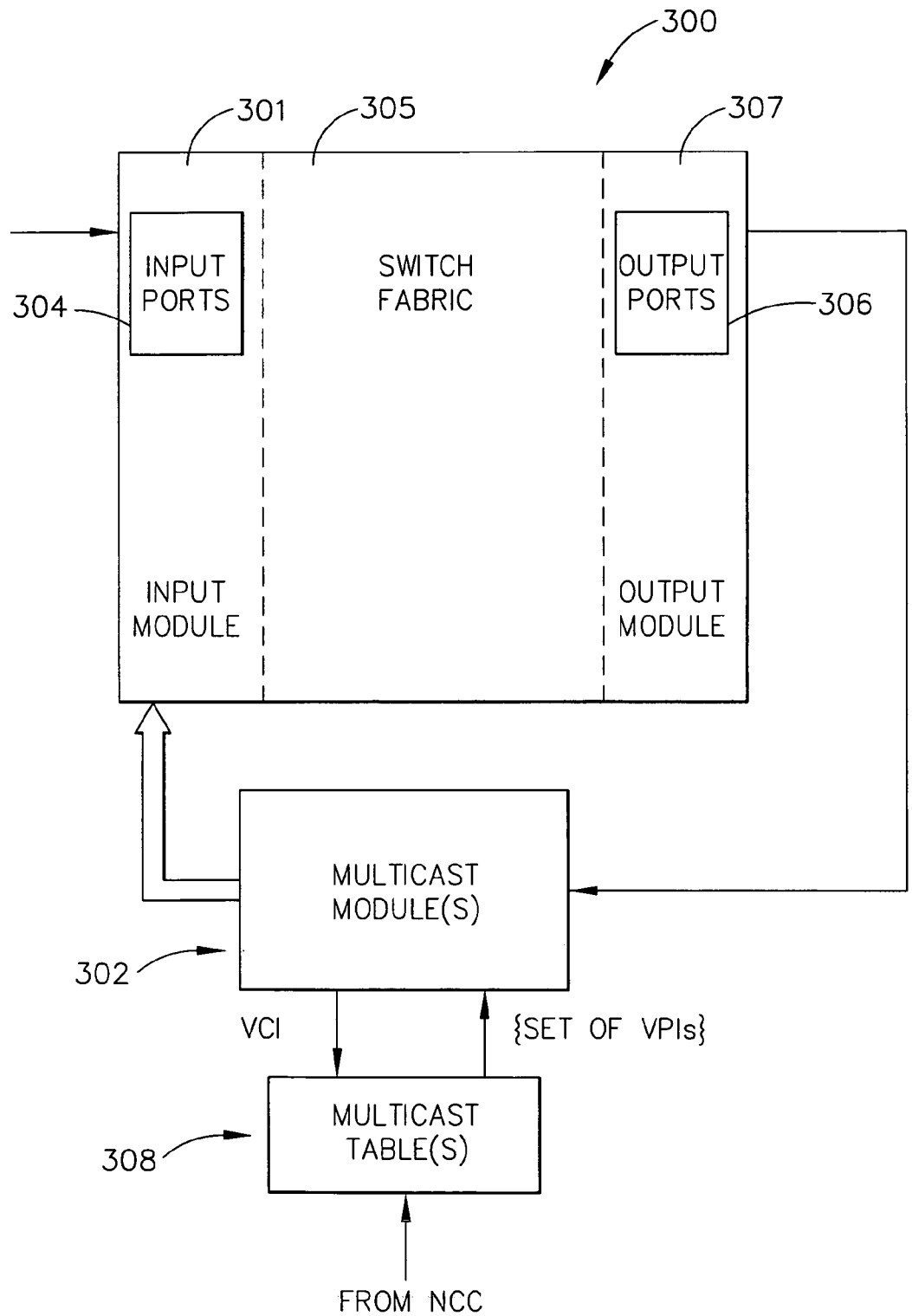
FIG. 3 illustrates an ATM switch on a processing satellite including multicast modules and multicast tables providing addressing for multicast ATM cells.

As shown in FIG. 3, multicast switching may be implemented at the satellite switching element 300 by using one or more multicast modules 302 connected between an input module 301 and output module 307 of the satellite switch 300. The satellite switch 300 includes several input ports 304 in an input module 301, several output ports 306 in an output module 307, and a switch fabric 305. Although the case of one multicast module will be examined below, more than one multicast module may be used.

A multicast module 302 may be implemented as a duplicating circuit which provides for the replication of the ATM cell seeking multicast switching (i.e., the "multicast cell"), and for relabeling of the addressing fields of the replicated multicast cells. Typically, each multicast module 302 is connected between the input module 301 and the output module 307 of the satellite switch 300. In addition, each multicast module 302 is connected to one or more multicast routing tables 308.

In accordance with the present method modified for multicast switching, the established set of VPIs (see step 104 of FIG. 1) includes one or more multicast VPIs. A multicast VPI is a particular type of VPI which is uniquely associated with an output port leading to a multicast module (rather than leading to a downlink transmission path, as described with respect to the present method).

Just as every "standard" ATM cell (i.e., non-multicast cell) is assigned a VPI in accordance with the present method (see step 108 in FIG. 1), every multicast cell in a system which provides for multicast switching is assigned a specific type of VPI, a "multicast VPI" (see step 108 of FIG. 1). A multicast VPI is a specific type of VPI that is, in general, uniquely associated with a multicast output port (i.e., an output port leading to a multicast module). Furthermore, the VCI which is assigned to the multicast cell (see step 108 of FIG. 1) indicates the multicast group to which the multicast cell belongs. For example, in a situation where a multicast cell is received at an input port 304 of a satellite switching element 300, the multicast VPI in the addressing field of that multicast cell is examined and translated by a header processor (as explained above with respect to FIG. 1 and the present method). Then, the multicast cell is routed to a specific output port 306 which corresponds to the multicast VPI examined and translated by the header processor. Generally, each specific output port 306 which corresponds to a multicast VPI directs multicast cells to a particular multicast module 302.

According to the present invention, one or more multicast routing tables 308 may be provided for use in determining to which multicast group the multicast cell belongs. Generally, upon receiving the multicast cell, the multicast module 302 reads the information stored at a particular memory storage location within one of the multicast routing tables 308. This memory storage location is generally determined by part or all of the VCI from the multicast ATM cell. The information stored at this memory storage location will typically be a set of VPIs which identifies the members of the multicast group (i.e., the multicast group VPIs).

Generally, each time a multicast group is created, a new VCI must be known to the multicast module. Accordingly, when a new multicast group is created, all or part of the addressing field (i.e., the VPI only or the VPI and a new VCI) needed to service such uplink multicast cells are entered into the multicast routing tables.

After determining the members of the multicast group, the multicast module 302 duplicates the current multicast cell to typically create at least as many reproduced ATM cells as there are distinct VPIs or downlink transmission paths leading to the members of the multicast group. In addition, the multicast module relabels each individual reproduced ATM cell with a new VPI (referred to below as a reassigned VPI) which, as in the present method discussed above, constitutes the routing tag for the individual reproduced ATM cells.

As each reproduced ATM cell is created by the multicast module 302 and then properly relabeled, the cells are output from the multicast module back to an input port of the ATM switch element which is generally dedicated to the multicast module. Subsequently, each reproduced ATM cell is presented to an input port of the ATM switch element, and then each reproduced cell is switched to the output port uniquely associated with its reassigned VPI, according to the present method illustrated in FIG. 1 and discussed above in detail. The output port uniquely associated with the reassigned VPI is referred to as the reproduced cell's "new output port."

In the simplest form of multicast switching (discussed above with respect to FIG. 3), a common VCI is used for each reproduced ATM cell so that the reproduced ATM cells differ only in their reassigned VPIs as they reenter the input ports of the ATM switch element. Further, since this common VCI may be the same one as is used in the uplink, no relabeling of the VCI is required. However, in a variation of the multicast switching refinement of the present method, the multicast module may also relabel the VCI of one or more of the reproduced ATM cells. As explained above with respect to the present method, the ATM switch (as used in the present invention modified for multicast switching) accomplishes the switching action based only on the VPI (i.e., it relies only on VP switching). Thus, relabeling of the VCI has no effect on the multicast switching function according to the present invention.

Figure 4A:
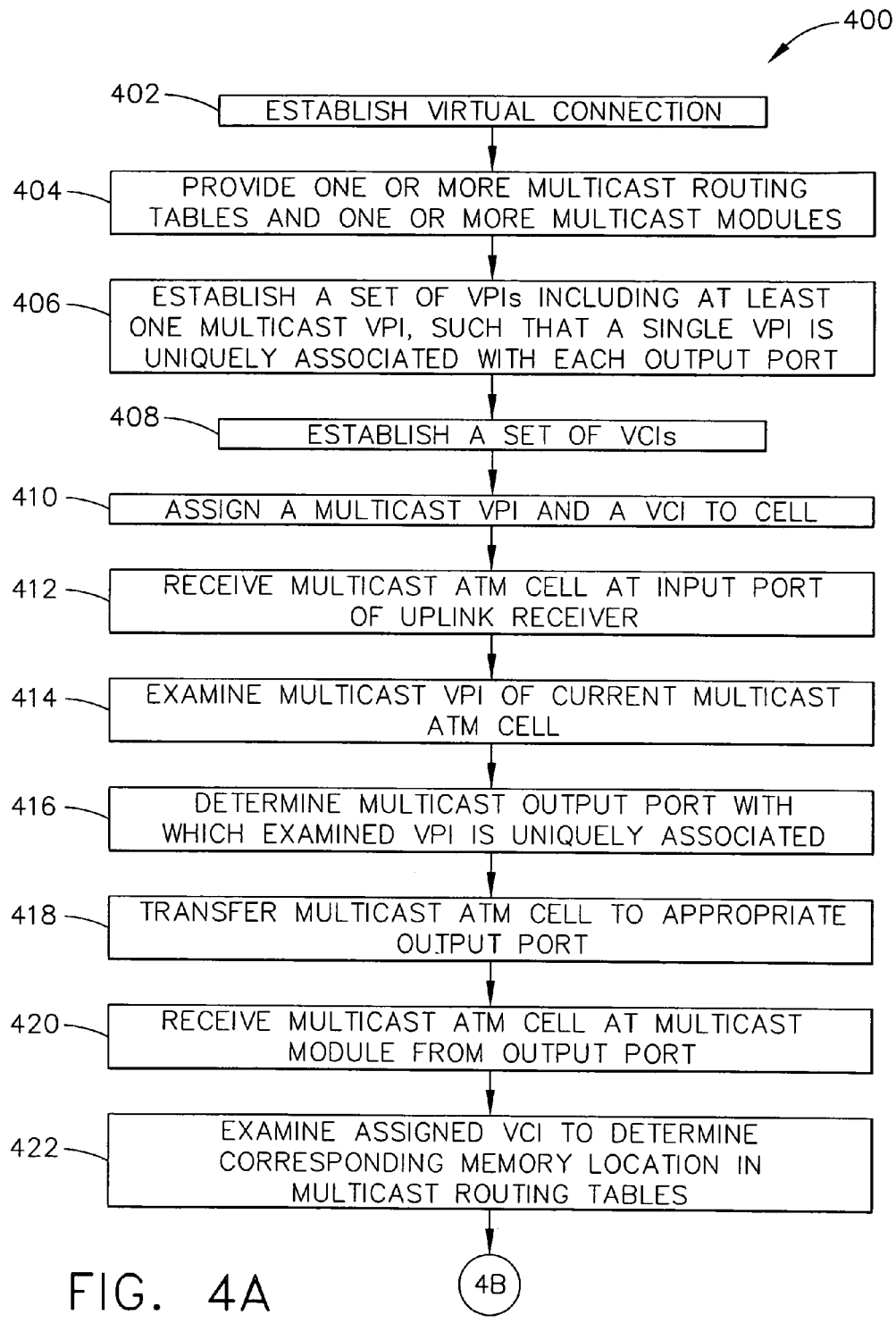
FIG. 4 illustrates a flow chart of a method for virtual path switching of an ATM cell, including provisions for multicast switching.
Figure 4B:
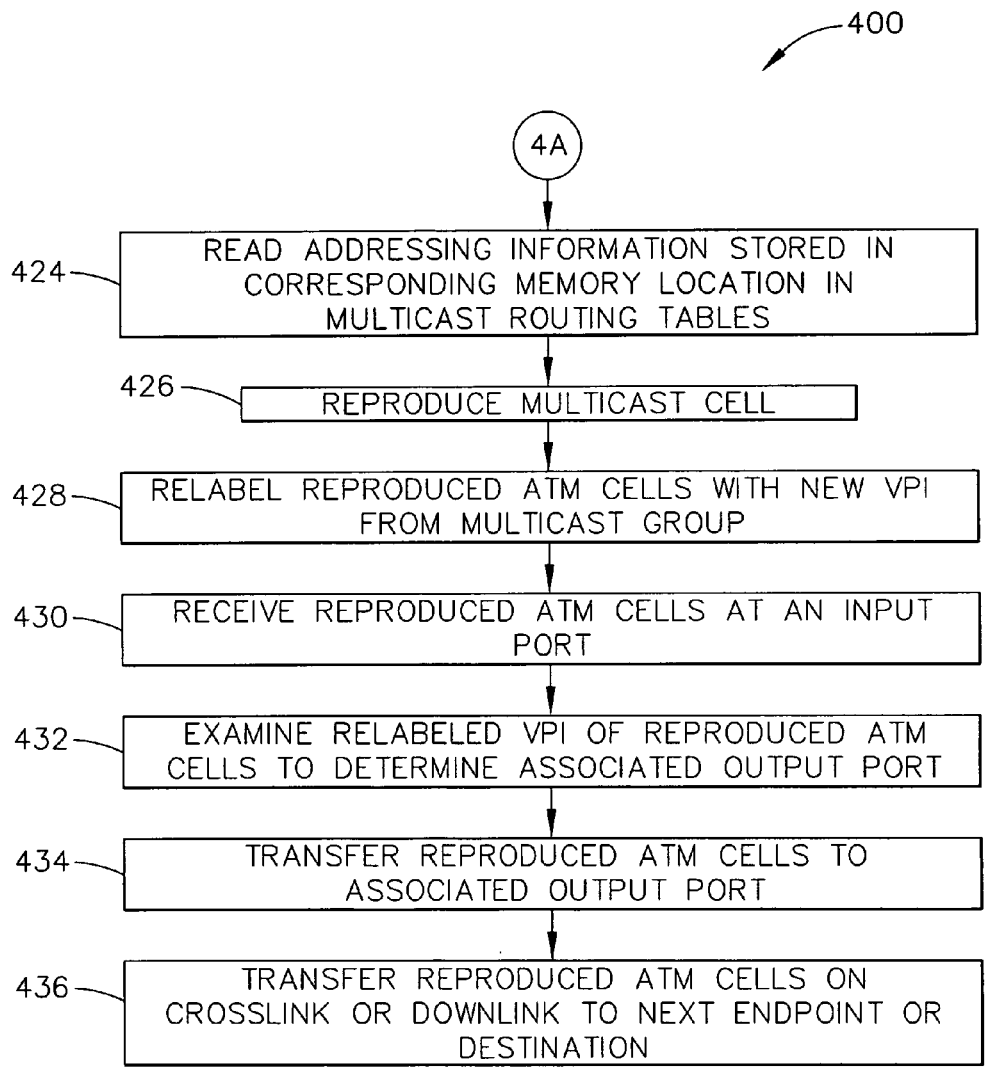

FIG. 4 illustrates a flow chart 400 of the present method for virtual path switching of ATM cell, where the method is modified to provide for multicast switching (referred to below as the "multicast switching method"). Similar to the preliminary steps implemented in the present method, the multicast switching method includes several preliminary steps 402–410 to prepare the processing satellite system for multicast switching of ATM cells. The preliminary steps include, for example, establishing a virtual connection 402, one or more multicast routing tables 404, a set of VPIs including at least one multicast VPI 408, and a set of VCIs 408. In addition, a VPI and a VCI are preferably assigned to the user terminal desiring to transmit multicast ATM cells 410. Where the ATM cell is a multicast cell, the VPI that is assigned will be a multicast VPI (as defined above). Similar to the present method, these preliminary steps are generally accomplished by the NCC.

Once the preliminary steps 402–410 are completed, an ATM cell may be received at an input port of the uplink receiver on the satellite 412. It is noted that for purposes of this discussion regarding the multicast switching method, it is assumed that the ATM cell is a multicast cell. Therefore, the VPI is a multicast VPI and the associated output port is a multicast output port.

At the input port of the uplink receiver, the multicast VPI is examined 414 to determine with which of the output ports that multicast VPI is uniquely associated 416. The multicast cell is then transferred to the multicast output port uniquely associated with the multicast VPI 418. Next, the multicast cell is received by the particular multicast module connected to the multicast output port uniquely associated with the multicast VPI 420. The VCI is then examined to determine, for example, a memory storage location within the multicast routing tables corresponding to that VCI 422, and the addressing information at that memory location is read to ascertain the members of the multicast group corresponding to the multicast cell 424.

As explained above, the multicast cell is duplicated to create at least as many reproduced ATM cells as there are distinct downlink transmission paths leading to the members of the multicast group 426. The reproduced ATM cells are relabeled with new VPIs (referred to as reassigned VPIs), such that the reassigned VPIs are determined based on the distinct downlink transmission paths leading to the members of the multicast group 428. The newly relabeled cells are then received at an input port of the ATM switching element 430, the reassigned VPIs are examined to determine with which output port each reassigned VPI is uniquely associated 432, and the newly relabeled cells are respectively transferred to the output port with which the reassigned VPIs are uniquely associated 434.

In a further embodiment, the present invention may be refined to provide for an external virtual path connection. When an ATM based processing satellite system forms part of an external ATM network, a virtual connection which transits the processing satellite system from this external ATM network (referred to below as an "external" virtual connection or an "externally managed" virtual connection) may be required.

An external VPC that transits a satellite based ATM switch in a processing satellite system is generally under the control of an external agency which retains management of the VPIs and VCIs (referred to as external VPIs and external VCIs, respectively) used within the external VPC. Thus, since the processing satellite system's NCC (or other terrestrial control infrastructure) cannot control the external VCIs, the external VPIs must be distinct from the VPIs under the management of the NCC. This avoids having any user terminals receive unwanted ATM cells.

Figure 5:
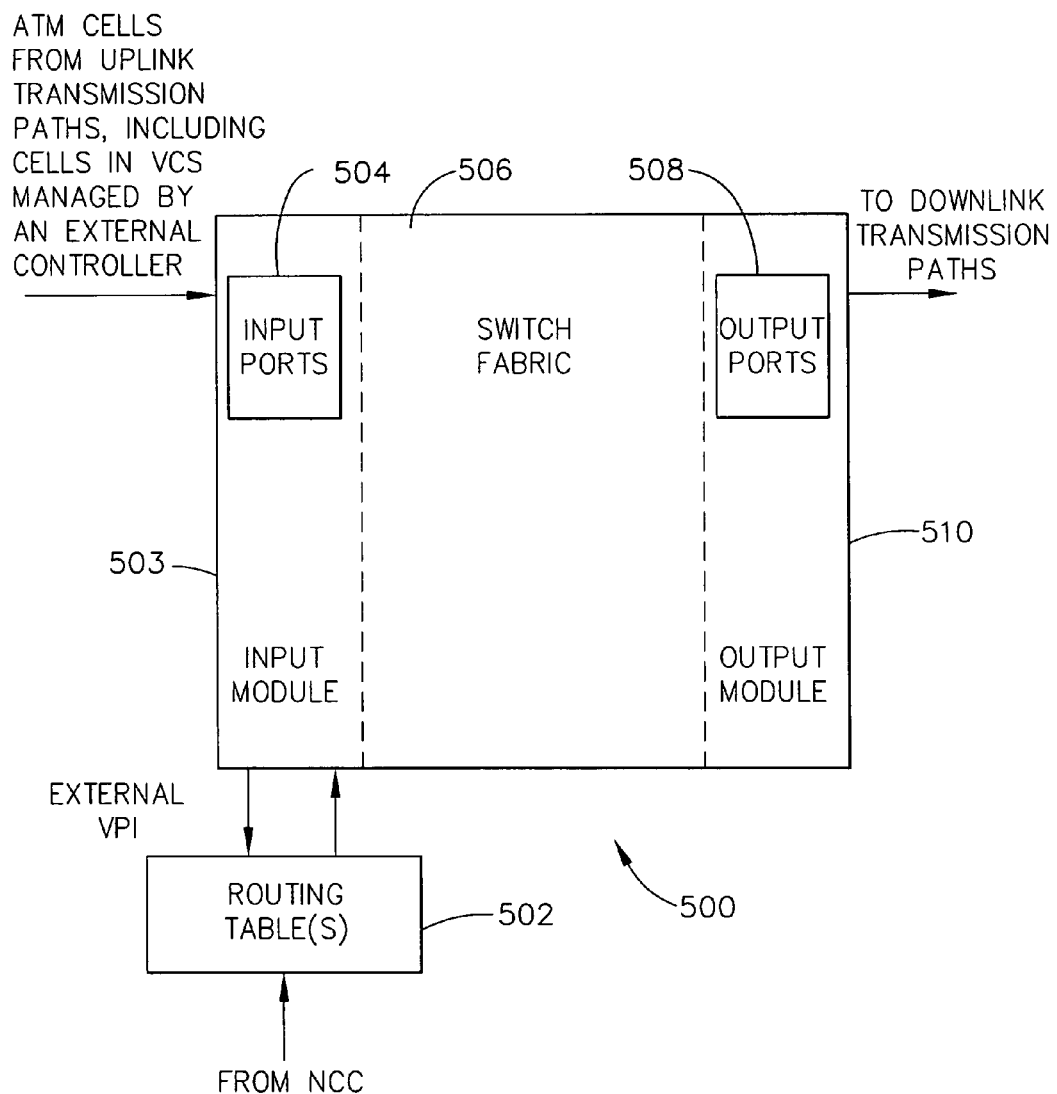
FIG. 5 illustrates an ATM switch on a processing satellite including input tables accounting for addressing of cells comprising VPIs managed by external controllers.

As illustrated in FIG. 5, the present invention may be refined to provide for an external virtual path connection by including one or more routing tables 502 on each processing satellite connected to the input module 504 of the ATM switch 500. The routing tables are referred to below as input routing tables 502. The input routing tables 502 contain information for mapping the external VPIs into the appropriate transmission path.

Figure 6:
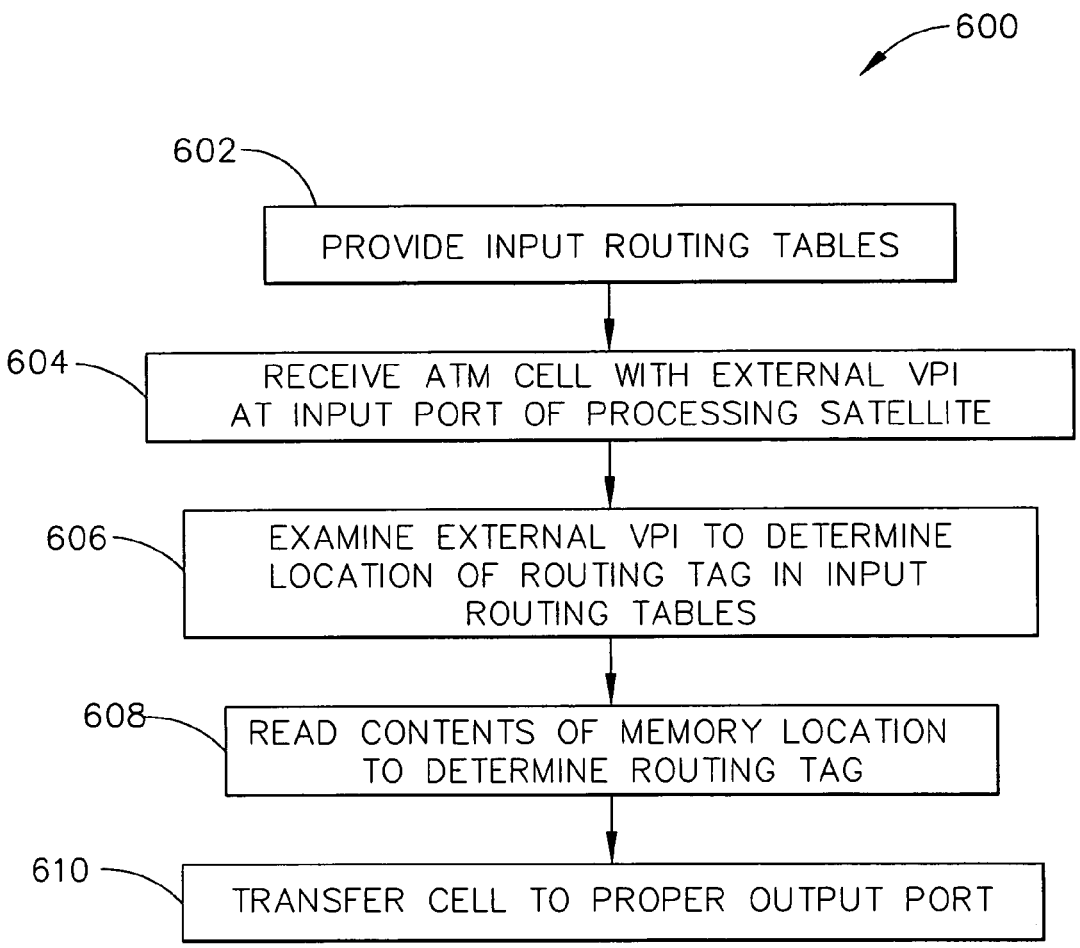
FIG. 6 illustrates a flow chart of a method for virtual path switching of an ATM cell, including provisions for addressing of cells with VPIs managed by external controllers.

FIG. 6 illustrates a flow chart 600 of the present method for virtual path switching of ATM cells, where the method is modified to provide for an external virtual path connection. Again, as described with respect to FIG. 1, several preliminary actions 102–108 occur to prepare the satellite for switching of ATM cells. For example, a virtual connection from origination to destination is established at step 102. However, unlike the VPC for the present method, an external VPC is managed by an external controller independent of the processing satellite communication system.

The method for virtual path ATM switching modified to allow for an external virtual path connection also includes establishing a set of VPIs and VCIs (104 and 106), and assigning a VPI and VCI to the current ATM cell 108, as described with respect to FIG. 1. However, with the modification allowing for an external virtual path connection, the assigned VPI and VCI are being managed by the external controller independent of the processing satellite communication system. Thus, the external VPC, the VPIs and the VCIs are established by the external controller, rather than the NCC. Similarly, the external controller (rather than the NCC) assigns a VPI and VCI to the ATM cell.

In addition to the preliminary actions 102–108 described with respect to FIG. 1, where the present method is modified to provide for an external virtual path connection, there is an additional preliminary step of providing one or more input routing tables 602. Each memory location of the input routing tables contains a routing tag that represents a particular output port of the ATM switch.

As illustrated by the flow chart 600 of FIG. 6, after the processing satellite communications system is prepared to switch an ATM cell with an external VPI, such an ATM cell may be received at an input port of a processing satellite 604. The external VPI is then examined to determine which memory location of the input routing tables contains the proper routing tag 606. The contents of that memory location are read by the ATM switch to determine the routing tag

608, and then the ATM cell with the external VPI is transferred to the particular output port represented by the determined routing tag.

Figure 7:
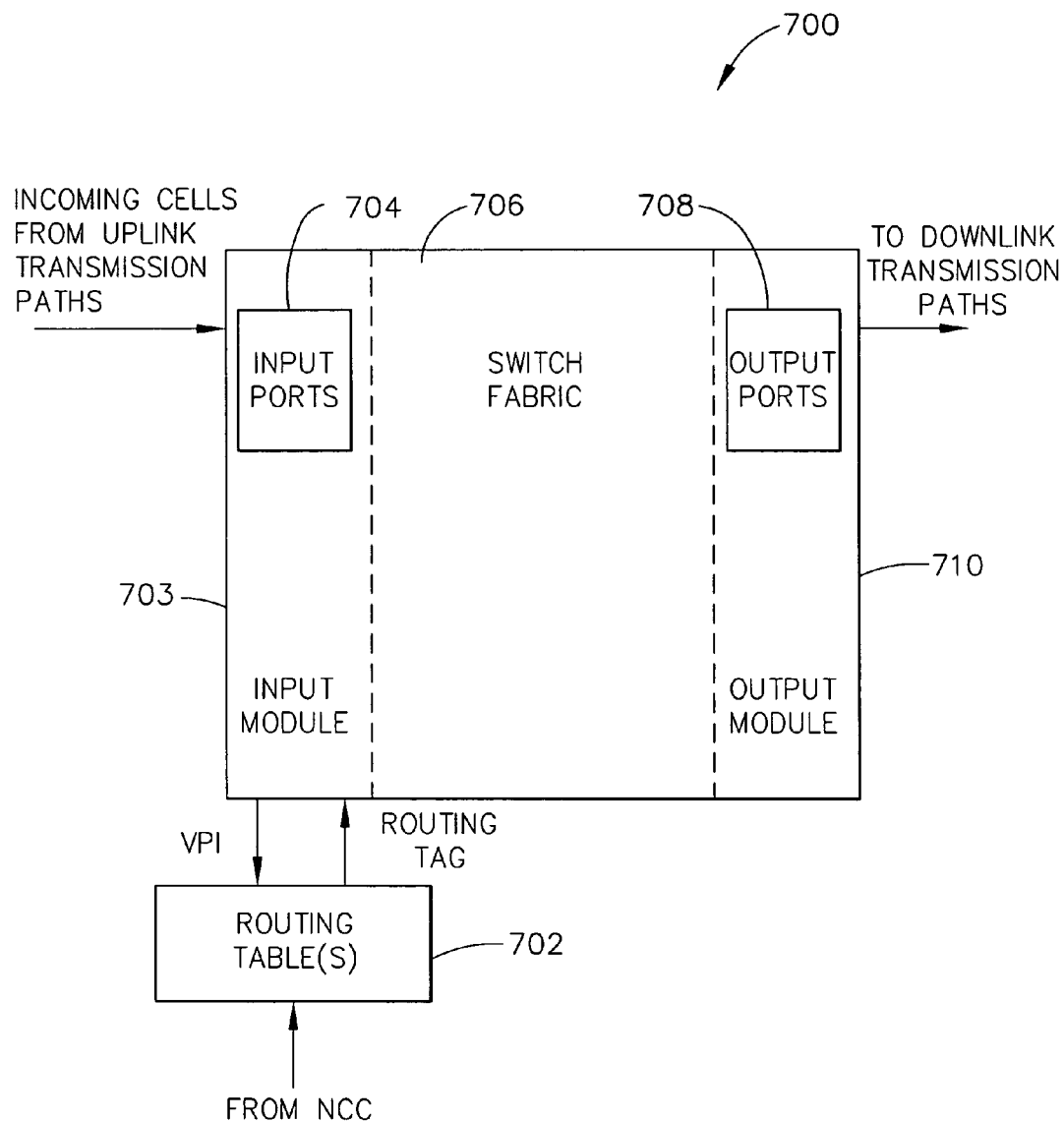
FIG. 7 illustrates an ATM switch on a processing satellite including input tables accounting for overflow addressing.

As illustrated in FIG. 7, the present method may be refined to provide for expanded addressing by including one or more routing tables 702 on the processing satellites connected to the input module 703 of the ATM switch 700 (referred to below as input routing tables).

Because the VCI field is 16 bits long, the present method may use as many as $2^{16}$, or 65,536 distinct addresses within a given downlink transmission path. In the event that more than $2^{16}$ addresses are required to support a given downlink transmission path, the present method may be modified by assigning more than one VPI to that transmission path. However, where multiple VPIs are assigned to a single transmission path, a single VPI no longer uniquely identifies one output port 708, as in the present method. In other words, there is no longer a one-to-one correspondence between the VPI and the output ports 708.

Because of the lack of a one-to-one correspondence between the VPI and the output ports 708, one or more routing tables 702 are connected to the input module 703 of the ATM switch 700 to aid the processing satellite in mapping the multiple VPIs for the virtual channels (VCs) supported by the downlink transmission path. Thus, the modification to account for expanded addressing is very similar to the modification for an external VPC.

The modification to allow for expanded addressing includes the step of establishing a virtual connection from origination to destination 102 (although the virtual connection is not necessarily an external connection), establishing a set of VPIs and VCIs (104 and 106), and assigning a VPI and VCI to the current ATM cell, as described with respect to FIG. 1. However, as explained above, with expanded addressing, there may not be a one-to-one correspondence between the assigned VPI and the associated output port, as in the present method.

In addition to the preliminary actions 102–108 described with respect to FIG. 1, where the present method is modified to allow expanded addressing, there is an additional preliminary step of providing one or more input routing tables 802. Each memory location of the input routing tables contains a routing tag that identifies the next virtual channel link of the virtual connection.

Figure 8:
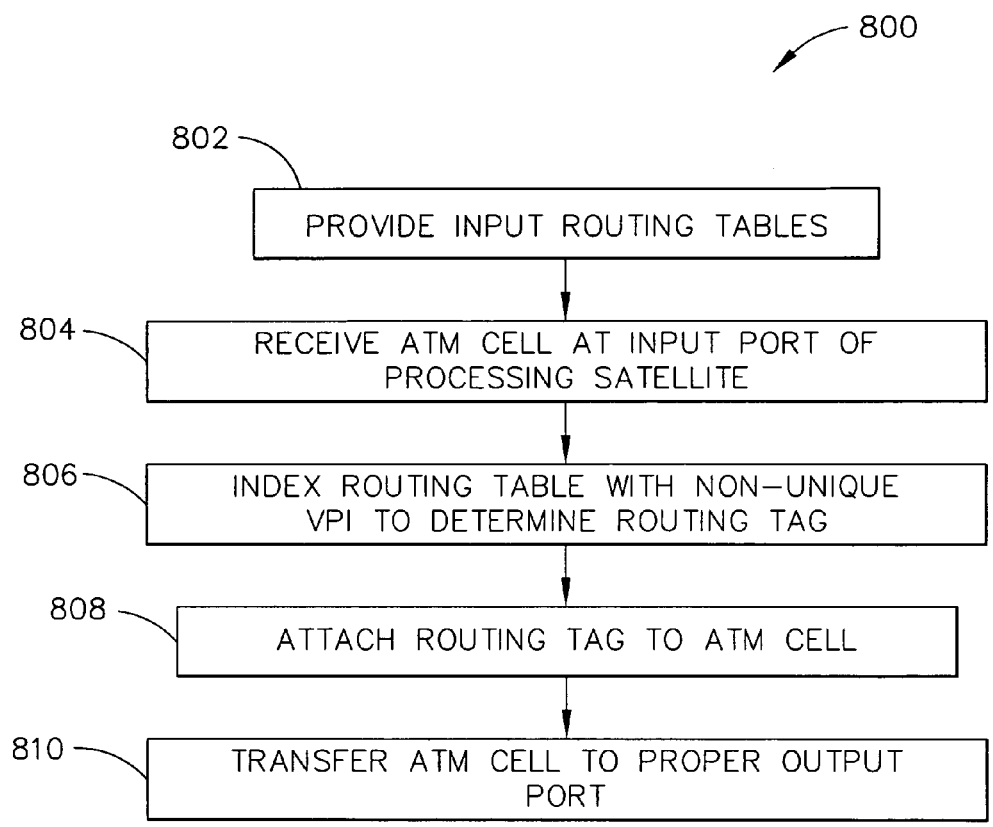
FIG. 8 illustrates a flow chart of a method for virtual path switching of ATM cell, including provisions for overflow addressing.

As illustrated by the flow chart 800 of FIG. 8, after the processing satellite communications system is prepared to switch an ATM cell with a VPI that does not uniquely identify an output port (steps 102–108 of FIG. 1, and step 802 of FIG. 8), the ATM cell may be received at an input port of a processing satellite 804. The non-unique VPI then indexes an input routing table to determine the appropriate routing tag 806, and that routing tag is attached to the ATM cell 808. Then the ATM cell is transferred to an output port based on the assigned routing tag.

The present method may be further refined to provide for special treatment of ATM cells on a VCC by VCC basis (referred to below as "VCC specialization"). Frequently in a processing satellite, actions are required that necessitate special treatment of ATM cells. For example, application of differing levels of error control on the downlink of a transmission path to accommodate different levels of attenuation at a given earth terminal would require special treatment of ATM cells. Another example of a situation calling for VCC specialization would be where there are differing levels of queuing priority of ATM cells at an the output port of an ATM switch to accommodate different cell delay variation and/or cell loss priority.

The present method may be modified to facilitate VCC specialization by setting aside a portion of the VPI to identify how a particular ATM cell is to be specially treated as it is being switched by the ATM switch fabric (referred to below as the "control subfield"). For example, one bit of the VPI may be reserved to indicate high or low priority in queuing. Another bit may be reserved for indicating the level of error control on the downlink.

In general, VCC specialization requires no change to the present method because the routing tag for the ATM cell may still be identified directly from the remaining bits (i.e., the routing subfield) of the VPI. It is important to note that since the control subfield is specified by the originating user terminal, VCC specialization does not require VCI routing tables (i.e., routing tables that are indexed by the VCI of an ATM cell).

The present invention thus provides an efficient, low cost method of virtual path ATM switching in a processing satellite communications system. While particular elements, embodiments and applications of the present invention have been shown and described, it is understood that the invention is not limited thereto since modifications may be made by those skilled in the art, particularly in light of the foregoing teaching.

For example, although the foregoing discussion is directed specifically to ATM cells, it is noted that data cells of virtually any format may be used. Furthermore, the invention is applicable beyond specifically VPIs and VCIs, and may be extended to apply to other address/subaddress techniques. In addition, it is noted that the multiple described modifications to the present method are not mutually exclusive, and any combination of these modifications may be implemented simultaneously.

It is therefore contemplated by the appended claims to cover such modifications and incorporate those features which come within the spirit and scope of the invention.

What is claimed is:

1. In a processing satellite communications system including at least one processing satellite having a receiver and a transmitter for respectively receiving and transmitting a data cell, a method for virtual path switching of said data cell, the method comprising:

receiving a data cell at one of a plurality of input ports of said processing satellite;

examining an assigned virtual path identifier (VPI) in said data cell to determine a destination output port associated with said assigned VPI;

transferring said data cell to said destination output port;

providing at least one multicast module on said processing satellite wherein said multicast module is associated with one multicast output port;

providing at least one multicast routing table having memory locations storing addressing information;

establishing a set of VPIs wherein each VPI is uniquely associated with a single output port on said processing satellite, and wherein at least one of said VPIs is a multicast VPI uniquely associated with said multicast output port;

establishing a set of VCIs;

assigning said multicast VPI to said data cell, wherein said transferring step comprises transferring said data cell to said multicast output port uniquely associated with said assigned multicast VPI;

assigning a VCI from said set of VCIs to said data cell;

receiving said data cell by said multicast module associated with said multicast output port;

examining said assigned VCI to determine a multicast group of VPIs from said set of VPIs;

reproducing said data cell to create a predetermined number of reproduced data cells; and reassigning each of said reproduced data cells with a new VPI from said multicast group of VPIs.

2. The method for virtual path switching of claim 1 wherein said examining step comprises indexing a memory storing said multicast group of VPIs.

3. The method for virtual path switching of claim 2 comprising:

receiving each of said reproduced data cells from said multicast module at one of said input ports;

examining each of said reassigned VPIs to determine a new output port corresponding to each of said reassigned VPIs; and transferring each of said reproduced data cells to said new output port corresponding to each of said reassigned VPIs.

4. The method for virtual path switching of claim 3 wherein said reproducing step comprises creating at least as many reproduced data cells as there are distinct VPIs in said multicast group of VPIs.

5. The method for virtual path switching of claim 3 further comprising reassigning the VCI of least one of said reproduced data cells.

6. In a processing satellite communications system including at least one processing satellite having a receiver and a transmitter for respectively receiving and transmitting a data cell, a method for virtual path switching of said data cell, the method comprising:

receiving a data cell at one of a plurality of input ports of said processing satellite;

examining an assigned virtual path identifier (VPI) in said data cell to determine a destination output port associated with said assigned VPI;

establishing a set of VPIs wherein each VPI is uniquely associated with a single output port on said processing satellite;

establishing a set of virtual channel identifiers (VCIs);

assigning said VPI from said set of VPIs and a VCI from said set of VCIs to said data cell;

attaching a selected routing tag to said data cell based on said assigned VPI, said routing tag identifying a next virtual channel link, wherein said assigned VPI is unchanged for each virtual channel link in a virtual connection; and transferring said data cell to said destination output port; wherein said step of assigning comprises assigning an externally managed VPI and an externally managed VCI, and wherein said step of examining comprises examining said assigned externally managed VPI in said data cell to determine a destination output port associated with said assigned externally managed VPI.

7. The method for virtual path switching of claim 6 further comprising:

providing at least one input routing table having memory locations storing routing tags, wherein said examining step further comprises examining said assigned externally managed VPI to determine a memory location in said at least one input routing table; and transferring said data cell to an output port represented by the routing tag contained in said memory location.

8. In a processing satellite communications system including at least one processing satellite having a receiver and a transmitter for respectively receiving and transmitting a data cell, a method for expanded address virtual path switching of said data cell, the method comprising:

receiving a data cell at one of a plurality of input ports of the processing satellite, said data cell including an assigned virtual path identifier (VPI) associated with a destination output port;

examining said assigned VPI in said data cell to determine said destination output port associated with said assigned VPI;

attaching a selected routing tag to said data cell based on said assigned VPI, said routing tag identifying a next virtual channel link, wherein said assigned VPI is unchanged for each virtual channel link in a virtual connection; and transferring said data cell to said destination output port based on said assigned VPI.

9. The method for virtual path switching of claim 8 further comprising:

assigning said assigned VPI to said data cell; and assigning a virtual channel identifier (VCI) to said data cell.

10. In a processing satellite communications system including at least one processing satellite having a receiver and a transmitter for respectively receiving and transmitting a data cell, a method for expanded address virtual path switching of said data cell, the method comprising:

receiving a data cell at one of a plurality of input ports of a processing satellite;

examining an assigned virtual path identifier (VPI) in said data cell to determine a destination output port;

attaching a selected routing tag to said data cell, said routing tag identifying a next virtual channel link;

transferring said data cell to said destination output port;

assigning said assigned VPI to said data cell;

assigning a virtual channel identifier (VCI) to said data cell;

establishing at least two VPIs corresponding to a single output port; and establishing a set of VCIs.

11. The method for virtual path switching of claim 10 further comprising storing routing tags in an input routing table, and wherein said step of examining further comprises determining said selected routing tag.

* * * * *